Patented June 15, 1943

2,321,736

UNITED STATES PATENT OFFICE 2,321,736

METHOD OF STIMULATING PLANTS

Robert N. Du Puis, Chicago, and Charles William Lenth, Wilmette, Ill., assignors to Association of American Soap & Glycerine Producers, Inc., New York, N. Y., a corporation of Delaware No Drawing. Application February 16, 1940, Serial No. 319,352

16 Claims. (Cl. 47—58)

This invention relates to a method of stimulating plants, and more particularly to processes for reducing the mortality in transplanted plants, and increasing the growth and resistance to certain diseases thereof.

The growth of plants is greatly retarded by transplanting, particularly where the plant is kept out of the soil for any considerable length of time. At the same time the resistance of the plant to destructive influences is reduced.

By means of the present invention the vitality of the plants during transplanting is increased, and their subsequent growth, life, and resistance considerably improved.

For example, in the tomato plant industry several hundred million seedlings are shipped from southern to northern points every year. These plants are ordinarily packed in bundles of 50 or 100, with wet peat moss around the roots to retard desiccation. It has been suggested that the peat moss also include nutrient materials and this has been done in some cases. The effect of such nutrient solutions is still somewhat controversial.

By means of the present invention the tomato seedlings, and particularly those parts of the assimilative systems thereof which are normally below ground, are treated with a solution of polyhydric alcohol, preferably glycerine.

In one instance the process of this invention may be practiced as follows: Tomato seedlings are removed from the soil in which they are growing and packed in bundles of approximately 50 to the bundle. The roots of the plants are then surrounded with an ample layer of peat moss, or other fibrous material, which has been thoroughly moistened with relatively weak glycerine solution. The wrapped bundle may be then placed in a shipping container, such as a ⅝ bushel hamper, and transported to the location where transplanting is to take place. The plants are then removed from the wrappings and from the bundle and planted in the usual manner. The time which may be permitted to elapse between removal from the soil and replanting may amount to as long as a week or more.

To illustrate the effect of the procedure above described and to compare the same with plants which are not given the benefit of the tonic process of this invention, growing tomato seedlings were removed from a field in uniform condition and treated as follows:

1. Tomato plants were made up into bundles and the roots wrapped in peat moss wet with water alone.

2. Tomato plants were made up into bundles and the roots wrapped in peat moss wet with 0.1% glycerine solution.

3. Tomato plants were made up into bundles and the roots wrapped with peat moss wet with 0.5% glycerine solution.

4. Tomato plants were made up into bundles and wrapped with peat moss wet with 2.5% glycerine solution.

The four lots were then placed in storage under conditions affecting all of the plants uniformly. At the end of three days of such storage, some of each lot of plants were replanted. Of these replanted plants about ⅙ of the plants whose roots had been wrapped with peat moss treated with water only, subsequently died. This mortality, of course, was dependent upon several factors, including initial conditions of the seedlings, the effect of handling, the atmospheric conditions prevailing at the time, and the like; but, under the same conditions, the plants whose roots had been wrapped with peat moss moistened with glycerine solutions exhibited a mortality which was considerably less than the mortality experienced with the water treated plants. The most favorable results appeared in the case of the plants treated with 0.1% glycerine solution, where the mortality was in these particular cases less than 7% as great as the mortality of the water-treated plants.

The remaining plants in each lot were then held in storage until the total storage period was seven days, at the end of which time the remaining plants were replanted and allowed to grow for seven days. More than two-thirds of the plants treated with water alone failed to survive under these particular conditions, while again the mortality of glycerine-treated plants was much less than the mortality of the plants treated with water alone. The most favorable results appeared in the case of the plants treated with 2.5% glycerine solution where the mortality was less than 18% of the mortality experienced with the water-treated plants. Furthermore, in the plants which did survive, those treated with glycerine solutions possessed from 30% to 50% more leaves and showed from 30% to 55% less incidence of stem canker lesions, which are growths of the micro-organism *Macrosporium solani*.

A great number of experiments of similar nature have been carried on and while the results of course vary in view of the variability of uncontrollable factors, the general results have indicated a clear preponderance in favor of the seedlings treated with the polyhydric alcohol solution.

As a further specific instance of the practice of the process of this invention the same has been applied as a tonic treatment to plants other than tomato plants in a manner permitting comparison with the results obtained with plants handled by conventional methods.

The roots of bunches of cabbage plants were packed in sphagnum moss and separate bunches were wet with the following liquids: water, 0.1% glycerine, 0.25% glycerine, 1% glycerine, and subjected to shipping. A similar lot of plants was shipped without moss packing, according to previous practice. The glycerine-treated plants experienced the lowest mortality (in the optimum concentration the mortality was less than 1/8 that of the controls), and also retained the greatest average number of leaves. The optimum glycerine concentration in this case appeared to be about 0.25%.

Furthermore, the treatment of onion plants during shipping with glycerine solutions in moss around the roots has been found to keep the plants fresher and greener while they were packed, so that they begin to grow sooner after being put in the ground. The plants send out new roots into the glycerine-containing moss while they are in the crates and show top growth under these conditions.

Although the above examples have described the use of glycerine solutions in treating plants, glycerine is only one of the polyhydric alcohols showing this stimulating effect on plants. The beneficial effects of other polyhydric alcoholic substances in comparison with water treatments have been definitely proved by experiment. For instance, the stimulating effect of sorbitol as reflected in mortality was revealed by storing young plants the roots of which were wrapped in peat moss treated with a 10% sorbitol solution and by comparing with plants treated with water as the liquid used for moistening the peat moss. The sorbitol-treated plants exhibit much lower mortality than those treated with water alone when set out in the field after five to eight days in storage.

Benefit of the treatment of plant roots with polyhydric alcohol solution are also obtained with many plants and plant parts other than those described above as examples. For instance, benefits can be shown by treating the roots of pepper, sweet potato, broccoli, lettuce, and other vegetable plants, as well as those of evergreens, fruit trees, roses, flowering plants, or any plant subject to transplanting. In the case of plants which are shipped in the dormant condition or those whose roots are not packed in wet material, the treatment may be carried out by dipping or soaking the roots in polyhydric alcohol solutions prior to planting. For example, it has been found that soaking the roots of roses in glycerine solutions before potting results in more rapid growth of the plants. Further, seeds, cuttings, tubers, root crops, and other plants and plant parts are benefited by treatment with polyhydric alcohol solutions.

As a specific instance of the effect of the process of this invention upon tubers, seed potatoes have been treated and comparatively tested. In doing this a potato planting was conducted by making up as nearly identical lots of seed potatoes as possible. Each lot totaled 30 lbs. in weight and was made up as nearly as possible of seed pieces cut to weigh about 2 oz. each. There was an unavoidable variation in the size of the pieces and the number of eyes per piece, but the lots were of sufficient size to substantially overcome the effect of such individual variations on the basis of the law of averages. As a control, one lot of these pieces was soaked one hour in water and planted immediately. The other lot of these pieces was soaked one hour in 0.1% glycerine solution and planted immediately. Upon harvesting, the total yield from the glycerine-treated seed was substantially larger than the total yield obtained from the control seed and a greater proportion of potatoes of marketable size and condition was obtained from the glycerine-treated seed.

In similar fashion and employing lots of seed prepared to be as nearly alike as possible, in the manner set forth above, one lot of seed as a control was soaked one hour in water, dried five hours in the air, and then planted and the other lot of seed was soaked one hour in 0.1% glycerine solution, dried five hours in the air and then planted. Upon harvesting the potatoes from this planting, a like increase in the yield and the proportion of marketable potatoes was noted in the potatoes derived from the glycerine-treated seed as compared with the potatoes derived from the control seed.

Since seed potatoes are commonly soaked in water solutions of formaldehyde or mercury compounds prior to planting, for the purpose of controlling disease, the addition of glycerine to the soaking water may be availed of with very little increase in cost and labor, with an attendant improvement in the resultant yield. While we have experienced the best results in the case of seed potatoes when a solution of approximately 0.1% glycerine is employed, a substantial increase in the concentration of glycerine may be employed, if desired, although the benefit of the treatment appears to decline sharply at concentrations of 1% glycerine and concentrations in excess of that amount ordinarily would not be desirable.

The result of treating roots of tomato plants with moss saturated with solutions of diethylene glycol and propylene glycol is shown below. These plants, including the control, were in storage six days before being set out in the field. The control plants were treated with water alone. Plants treated with 0.1% solution of diethylene glycol sustained a mortality of about 1/5 that of the control plants, while the plants treated with a 0.25% solution of diethylene glycol experienced an even lower mortality. Plants treated with 0.1% solution of propylene glycol sustained a mortality of approximately 1/2 that sustained by the control plants, while plants treated with a 0.25% solution of propylene glycol sustained a mortality of approximately $\frac{1}{10}$ that sustained by the control plants.

The optimum concentration of polyhydric alcohol in these treatments will vary according to the type and condition of the plant treated. For example, in the case of glycerine treatment of tomato plants, favorable results have been obtained by the use of concentrations ranging from 0.1% to 10%. In general, the more succulent plants require a weaker solution, whereas "hard" or woody plants need a stronger solution.

It has also been noted that bulbs, such as narcissus, amaryllis, hyacinth, and the like, forced indoors in gravel and dilute solutions of glycerine give greater and quicker growth and flowering than control bulbs grown in water alone. The reason for these apparent stimulating actions is not obvious, but since they have been observed in very low glycerine concentrations (of the order of 0.1%) they probably do not result primarily from the humectancy of the glycerine.

In the claims hereof, by the term "plant" we mean to include such dormant stages as seeds, bulbs and tubers and dormant trees and shrubs.

The foregoing detailed description has been given for clearness of understanding only, and no unnecessary limitations should be understood therefrom.

What we claim as new and desire to secure by Letters Patent is:

1. The method of maintaining viability of plant material during storage and shipment which consists in placing in contact with assimilative parts thereof which are normally below ground a water solution containing polyhydric alcohol in a concentration from .1 to 10%.

2. The method of maintaining viability of plant material during storage and shipment which consists in placing in contact with the roots thereof a substance containing a water solution containing polyhydric alcohol in a concentration from .1 to 10%.

3. The method of maintaining viability of plant material during storage and shipment during transplanting which consists in placing in contact with the assimilative system thereof which is normally below ground a water solution containing polyhydric alcohol in a concentration from .1 to 10%.

4. The method of maintaining viability of plant material during storage and shipment during transplanting which consists in wrapping the roots of said plants with inert fibrous material moistened with a water solution of polyhydric alcohol having a concentration from .1 to 10%.

5. The method of maintaining viability of plant material during storage and shipment which consists in placing in contact with the assimilative system of said plant which is normally below ground a water solution containing from 0.1% to 10% of glycerine.

6. The method of maintaining viability of plant material during storage and shipment which consists in placing in contact with assimilative parts of said plant which are normally below ground a dilute water solution of a glycol.

7. The method of maintaining viability of plant material during storage and shipment which consists in placing in contact with assimilative parts of said plant normally below ground a dilute water solution of sorbitol.

8. A package for maintaining viability of plant material during storage and shipment comprising living plant material, a small amount of dilute polyhydric alcohol solution in contact with assimilative parts thereof which are normally below ground, and absorbent material maintaining the solution upon the plant material.

9. A package for maintaining viability of plant material during storage and shipment comprising living plant material, a small amount of dilute polyhydric alcohol solution in conact with assimilative parts thereof which are normally below ground, and non-living absorbent material maintaining the solution upon the plant material.

10. A package as set forth in claim 8, in which the polyhydric alcohol solution includes glycerine.

11. A package as set forth in claim 8, in which the polyhydric alcohol solution includes a glycol.

12. A package as set forth in claim 8, in which the polyhydric alcohol solution includes sorbitol.

13. The method of maintaining viability of plant material during storage and shipment which consists in maintaining in contact with the roots thereof an absorbent material having absorbed therein a water solution containing as its essential ingredient from .1 to 10% of a polyhydric alcohol.

14. The method of maintaining viability of plant material during storage and shipment which consists in maintaining in contact with the roots thereof an aqueous solution containing glycerine having a concentration substantially in the range of 0.1% to 1%.

15. The method of maintaining viability of plant material during storage and shipment which consists in maintaining in contact with assimilative parts thereof which are normally below ground absorbent material having absorbed therein an aqueous solution containing glycerine having a concentration substantially in the range of 0.1% to 1%.

16. The method of maintaining viability of plant material during storage and shipment which consists in maintaining in contact with assimilative parts thereof which are normally below an aqueous solution containing glycerine having a concentration substantially in the range of 0.1% to 1%.

ROBERT N. DU PUIS.
CHARLES WILLIAM LENTH.